United States Patent [19]
Ooi

[11] Patent Number: 5,903,674
[45] Date of Patent: May 11, 1999

[54] PICTURE CODING APPARATUS

[75] Inventor: Yasushi Ooi, Tokyo, Japan

[73] Assignee: NEC Corporation, Tokyo, Japan

[21] Appl. No.: 08/939,169

[22] Filed: Sep. 29, 1997

[30]     Foreign Application Priority Data

Oct. 3, 1996   [JP]   Japan ................................. 8-262947

[51] Int. Cl.$^6$ ................................................. G06K 9/00
[52] U.S. Cl. ........................................... 382/238; 382/248
[58] Field of Search ....................... 364/715.02; 345/302, 345/327; 348/390; 395/200.51, 500; 382/166, 234, 232, 233, 235, 236, 238, 239, 244, 245, 246, 248, 250, 251, 252, 253, 302, 303, 304, 305, 307, 309, 312

[56]            References Cited

U.S. PATENT DOCUMENTS

| | | | |
|---|---|---|---|
| 5,212,742 | 5/1993 | Normile et al. ............................ | 382/56 |
| 5,611,038 | 3/1997 | Shaw et al. ............................... | 395/806 |
| 5,703,793 | 12/1997 | Wise et al. ................................ | 382/232 |

OTHER PUBLICATIONS

T. Matsumura et al., "A Chip Set Architecture for Programmable Real-Time MPEG2 Video Encoder", *IEEE 1995 Custom Integrated Circuits Conference*, 1995, pp. 393–396.

S. Nakagawa et al., "A Single Chip, 5 GOPS, Macroblock-Level Pixel Processor for MPEG2 Real-Time Encoding", *IEEE 1995 Custom Integrated Circuits Conference*, 1995, pp. 397–400.

T. Akiyama et al., "MPEG2 Video Codec Using Image Compression DSP", *IEEE Transactions on Consumer Electronics*, vol. 40, No. 3, Aug. 1994, pp. 466–472—(Paper Received Jun. 27, 1994).

"Chip Set for MPEG Encoding Developed by Matsusita—COMET, VDSP2", *Denshi Gijutsu (Electronics Technology)*, Feb. 1996, pp. 2–7 with translation of the Abstract.

T. Kondo et al., "A Two-Chip Real-Time MPEG2 Video Encoder with Wide Range Motion Estimation", *Hot Chips VII*, Stanford, CA, Aug. 14–15, 1995, pp. 95–101.

K. Suguri et al., "A Real-time Motion Estimation and Compensation LSI with Wide-Search Range for MPEG2 Video Encoding", *1996 IEEE Int'l Solid-State Circuits Conference*, Feb. 9, 1996, pp. 242–243 & 253.

T. Okubo et al., "Development of a Two Chip Real-Time MPEG2 SP@ML Video Encoder", C-562, *Institute of Electronics, Information and Communication Engineers*, Mar. 1996, pp. 178 w/Abstract.

A. Ngai et al., "VLSI Architecture of the I-Frame encoder for the MPEG-2 Video Compression", *Hot Chips VII*, Stanford, CA, Aug. 14–15, 1995, pp. 103–110.

*Primary Examiner*—Scott Rogers
*Assistant Examiner*—Bijan Tadayon
*Attorney, Agent, or Firm*—Sughrue, Mion, Zinn, Macpeak & Seas, PLLC

[57]           ABSTRACT

Video-inputting portion 3, video-outputting portion 8, motion-estimating portion 4, pixel-level-arithmetic portion 5, variable-length-encoding portion 6, and code-outputting portion 7 are coupled with frame memory 10 through buffer and frame memory controlling portion 9 and controlling processor 1 through host interface portion 2. Frame memory 10 is accessed by video-inputting portion 3, video-outputting portion 8, motion-estimating portion 4, pixel-level-arithmetic portion 5, variable-length-encoding portion 6, and code-outputting portion 7 in time sharing manner. Controlling of video-inputting portion 3, video-outputting portion 8, motion-estimating portion 4, pixel-level-arithmetic portion 5, variable-length-encoding portion 6, and code-outputting portion 7 is centralized in controlling processor 1. Portions in dotted frame 20 are integrated in one LSI chip.

17 Claims, 8 Drawing Sheets

FIG. 6

F: LUMINANCE SIGNAL OF REFERENCE PICTURE FOR MOTION-ESTIMATING IN FORWARD DIRECTION (READ)

B: LUMINANCE SIGNAL OF REFERENCE PICTURE FOR MOTION-ESTIMATING IN BACKWARD DIRECTION (READ)

I: PICTURE INPUTTING (WRITE) AND ENTIRE DIFFERENCE JUDGEMENT (READ)

O: PICTURE OUTPUTTING (READ)

V: OUTPUT CODE FROM VARIABLE-LENGTH-ENCODING PORTION (WRITE)

Cr: COLOR DIFFERENCE SIGNAL IN REFERENCE PICTURE (READ)

Yc, Cc: LUMINANCE AND COLOR DIFFERENCE SIGNALS OF CURRENT PICTURE (READ)

L: OUTPUT PICTURE OF PIXEL-LEVEL-ARITHMETIC PORTION (WRITE)

S: OUTPUT CODE (READ)

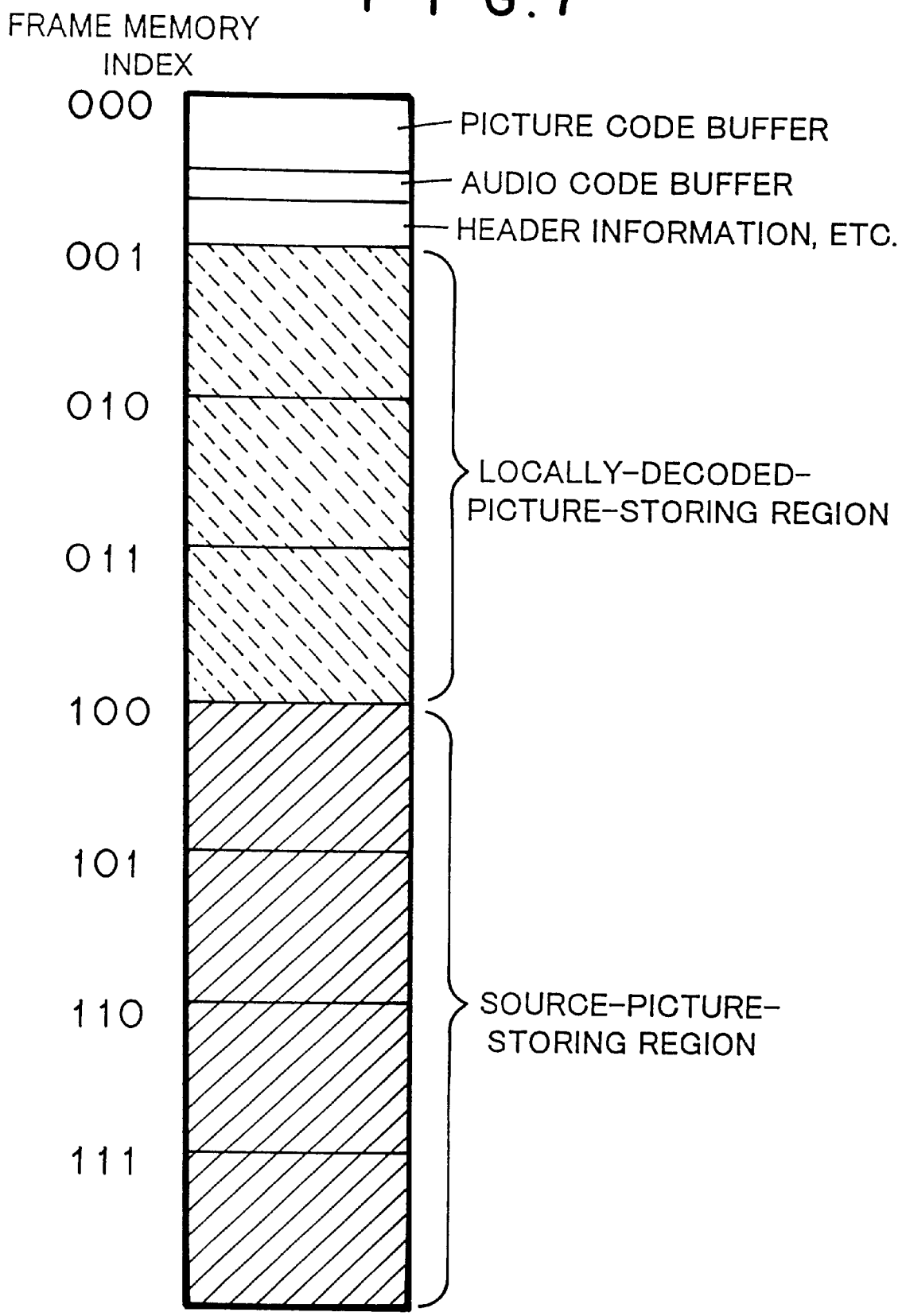

FIG. 10

| PROCESS | FREQUENCY (/SEC) | NUMBER OF STEPS OF CONTROLLING PROCESS | REQUIRED PERFORMANCE (MIPS) |
|---|---|---|---|
| AUDIO CODE TRANSMITTION | ~50,000 | 30 | ~1.5 |
| CODE AMOUNT CONTROL | 900 | 500 | 0.45 |
| OTHER PROCESSES (ONCE PER PICTURE) | 30 | 2,000 | 0.06 |
| TOTAL | | | 2.0 |

PICTURE CODING APPARATUS

BACKGROUND OF THE INVENTION

1. Field of the Invention

The present invention relates to a picture coding apparatus and more specifically, to a picture coding apparatus comprising a dedicated LSI for picture coding.

2. Description of the Related Art

A conventional picture coding apparatus comprises plural specialized LSIs for picture coding. A CPU is mounted on each of the LSIs and a frame memory is coupled with each of the LSIs.

For example, a picture coding comprising three kinds of specialized LSIs for picture coding is described in 17.1.1 "A Chip Set Architecture for Programmable Real-Time MPEG Video Encoder" (on pages 393–396) of preliminary paper of IEEE COSTOM INTEGRATED CIRCUITS CONFERENCE hold in May 1995. FIG. 2 of the title shows that three memory chips are necessary for the encoder. FIG. 4 and 6 of the title show that two of the three LSIs have controlling processors. Moreover, In 17.1.2 "A Single Chip, 5 GOPS, Macroblock-Level Pixel Processor for MPEG" Real-Time Encoding" (on pages 397–400) of the preliminary paper, the details of one of the three LSIs, a pixel processor, is described. FIG. 7 of the title shows that RISC unit occupies about 20 percent of the chip area.

For another example, a CODEC which comprises two kinds of specialized LSIs for picture coding are described with reference to FIGS. 8 and 9 in "MPEG2 VIDEO CODEC USING IMAGE COMPRESSION DSP" on pages 466–472 of IEEE Transactions on Consumer Electronics, Vol. 40, No. 3 published in August 1994. It is apparent that two LSIs has their own memory chips.

Another example of the similar system is described on pages 2–7 of an issue the February 1996 of "Denshi Gijutsu (Electronics Technology)" published by Nikkan Kogyo newspaper office in Japan. FIG. 7 on page 6 shows that each of two kinds of LSIs necessitates its own memory. It is described that one chip (VDSP) of the two kinds of LSI adapts a programmable architecture.

For further example, on page 98 of proceedings of lecture of Hot Chips VII, a video encoder comprising two kinds of specialized LSIs for picture coding is described. FIG. 4.1–08 shows that the encoder comprises two kinds of chips for picture coding: ENC-M and ENC-C. FIG. 4.1–12 shows that controlling processor occupies one-fourth area of ENC-C chip.

ENC-M chip is described in "A Real-time Motion Estimation and Compensation LSI with Wide-Search Range for MPEG2 Video Encoding" on pages 242–243 and 453 of a digest of technical papers of IEEE International Solid-State Circuits Conference. FIG. 6 on page 453 of the title shows that controlling processor (RISC) occupies one-fourth area of the LSI.

For still further example, a similar picture coding apparatus is described in C-562, on page 178, of a preliminary papers of meeting of the Institute of Electronics, Information and Communication Engineers hold in March 1996 in Japan. The figures on the page shows that two kinds of memory chips are required in the apparatus.

For more further example, a picture coding apparatus comprising three kinds of specialized LSIs is described on page 105 of proceedings of Hot Chips VII. FIG. 4.2–06 of the title shows the structure. Although the internal structure is not described apparently, it is specified that the system requires three kinds of memory chips as well as the number of LSI chips.

One problem of the aforementioned picture coding apparatuses is that plural kinds of specialized LSIs are required, the size of the LSIs are large, and the cost for manufacturing the apparatus using them becomes high eventually. The increase of the area by 20 to 30 percent when using a CPU in a specialized LSI for picture coding results in the increase of cost. The necessity of a CPU in a picture coding LSI is caused by including programmable portion for controlling itself. Although the programmable portion is not required if the picture coding LSI is designed based on beforehand and sufficient consideration on the specification, too much programmable portion accompanying increase of chip area is introduced to make the chip more flexible than required for tuning up the picture coding apparatus.

Second problem of the aforementioned picture coding apparatus is that the number of components increases and eventually the cost and power consumption of the apparatus increase. In addition to plural picture coding LSI chips, plural memory chips belonging to each of LSI chips are required. This is caused because it is impossible to integrate every picture coding functions containing too much programmable portions in one chip using LSI process nowadays.

SUMMARY OF THE INVENTION

An object of the present invention is to provide a picture coding apparatus which has a small number of components.

Another object of the present invention is to miniaturize a picture coding LSI.

According to the present invention, there is provided a picture coding apparatus for executing intra-frame predictive picture coding which comprises video-inputting means for inputting picture data, motion-estimating means for estimating motion-vector of each of macro-blocks of said picture data, pixel-level-arithmetic means which performs orthogonal transform, quantization, dequantization, and inverse orthogonal transform, variable-length encoding means, code-outputting means, frame memory, frame-memory-controlling means coupled with said frame memory, controlling processor, and host interface means coupled with said controlling processor, wherein said video-inputting means, said motion-estimating means, said pixel-level-arithmetic means, said variable-length encoding means and said code-outputting means are coupled with said frame-memory-controlling means through individual buffers independent each other, said video-inputting means, said motion-estimating means, said pixel-level-arithmetic means, said variable-length encoding means and said code-outputting means execute time-shared data transmission with said frame memory, said video-inputting means, said motion-estimating means, said pixel-level-arithmetic means, said variable-length encoding means and said frame-memory-controlling means are coupled with said host interface means, and comprise registers of which contents are referred to and set by said controlling processor.

According to the present invention, the picture coding apparatus further comprises video-outputting means for monitoring the quality of locally decoded picture coupled with said frame-memory-controlling means through another buffer.

According to the present invention, the picture coding apparatus further comprises audio-coding means coupled with said controlling processor, wherein said controlling processor receives audio code from said audio-coding means, writes said audio code in said frame memory, said code-outputting means read said audio code, video code, and header data independently each other from said frame memory, edits said audio code, said video code, and said header data, and output said audio code, said video code, and said header data.

These and other objects, features and advantages of the present invention will become more apparent in light of the following detailed description of best mode embodiments thereof, as illustrated in the accompanying drawings.

BRIEF DESCRIPTION OF DRAWINGS

FIG. 6 is a timing chart showing time scheduling of access to frame memory 10 shown in FIG. 1;

FIG. 7 is a chart showing memory map of frame memory 10 shown in FIG. 1;

FIG. 10 is a table showing required performance of controlling processor 1 shown in FIG. 1.

DESCRIPTION OF PREFERRED EMBODIMENTS

Next, embodiments of the present invention will be described in detail.

Figure 1:
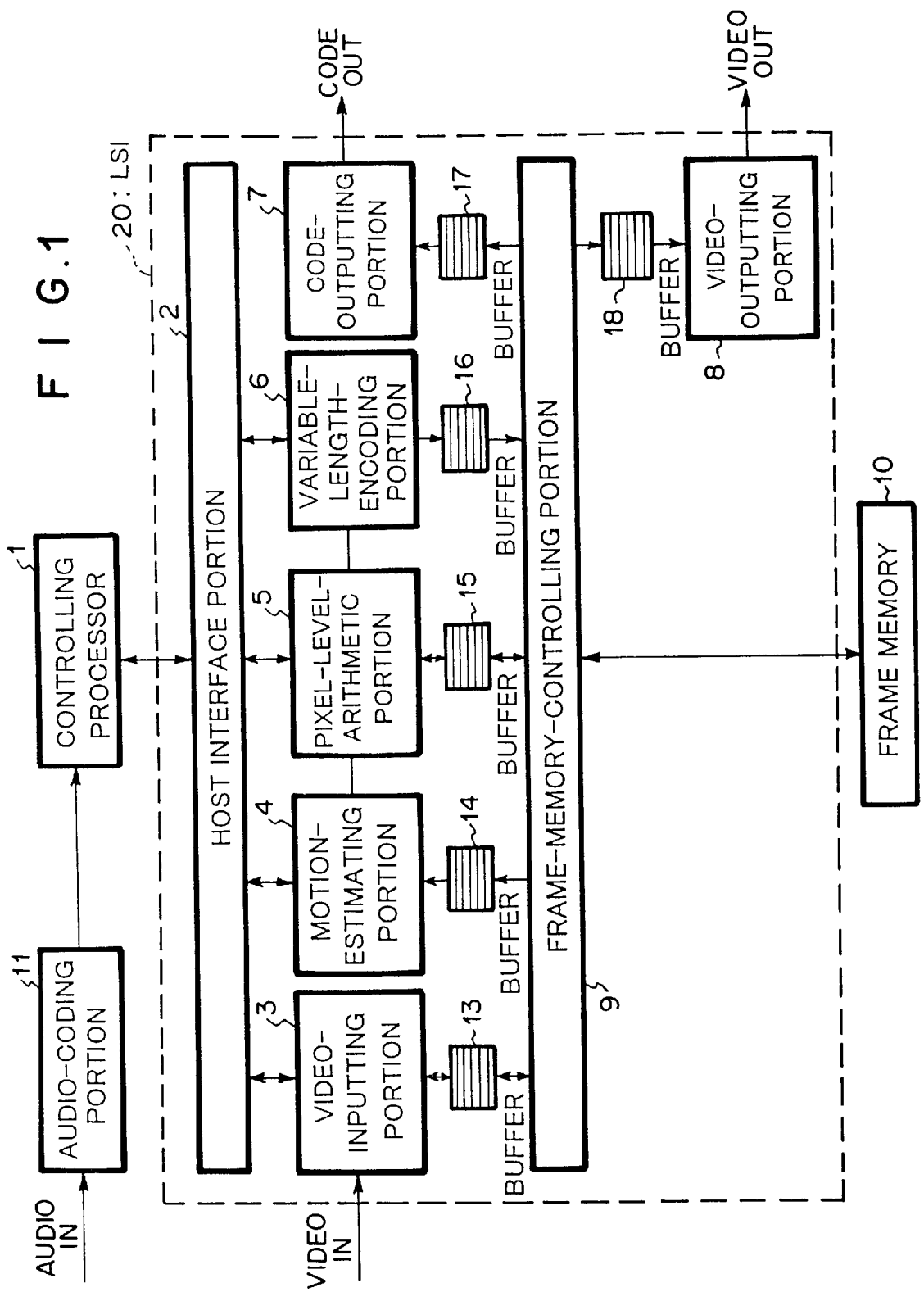
FIG. 1 is a block diagram showing an example of the structure of a picture coding apparatus according to an embodiment of the present invention.

FIG. 1 is a block diagram showing the structure of one embodiment of the present invention.

One chip LSI 20 comprises host interface portion 2, video-inputting portion 3, motion-estimating portion 4, pixel-level-arithmetic portion 5, variable-length-encoding portion 6, code-outputting portion 7, vide-outputting portion 8, frame-memory-controlling portion 9, and buffers 13 to 18.

The flow of picture coding is described as follows. Video signal is supplied to video-inputting portion 3. Video-inputting portion 3 converts the format of video signal. For example, it converts 4:2:2 video signal to 4:2:0 video signal. Video-inputting portion 3 also judges whether if there is entire difference between a current picture and a preceding picture, restricts band-width of video signal, and reduces noise components from video signal if necessary. For the judgement, video-inputting portion 3 comprises entire-picture-difference-detecting circuit. Video signal thus processed in video-inputting portion 3 is temporally stored in buffer memory 13, and then read from it and stored in frame memory 10 under the control of frame-memory-controlling portion 9.

All access to frame memory 10 is controlled by frame-memory-controlling portion 9.

Afterward, picture data required for inter-frame predictive coding is read from frame memory 9 and transferred to motion-estimating portion 4 through buffer 14. Pictures required for inter-frame predictive coding are a current picture and reference pictures. In the case of bi-directional prediction, reference pictures are a forward picture and a backward picture. A picture takes either a frame structure or a field structure depending on prediction mode. The transferred pictures are of only luminance component because of the algorithm of motion estimation. When motion estimation is completed, a predicted picture and prediction errors are directly transferred from motion-estimating portion to pixel-level-arithmetic portion 5.

Figure 2:
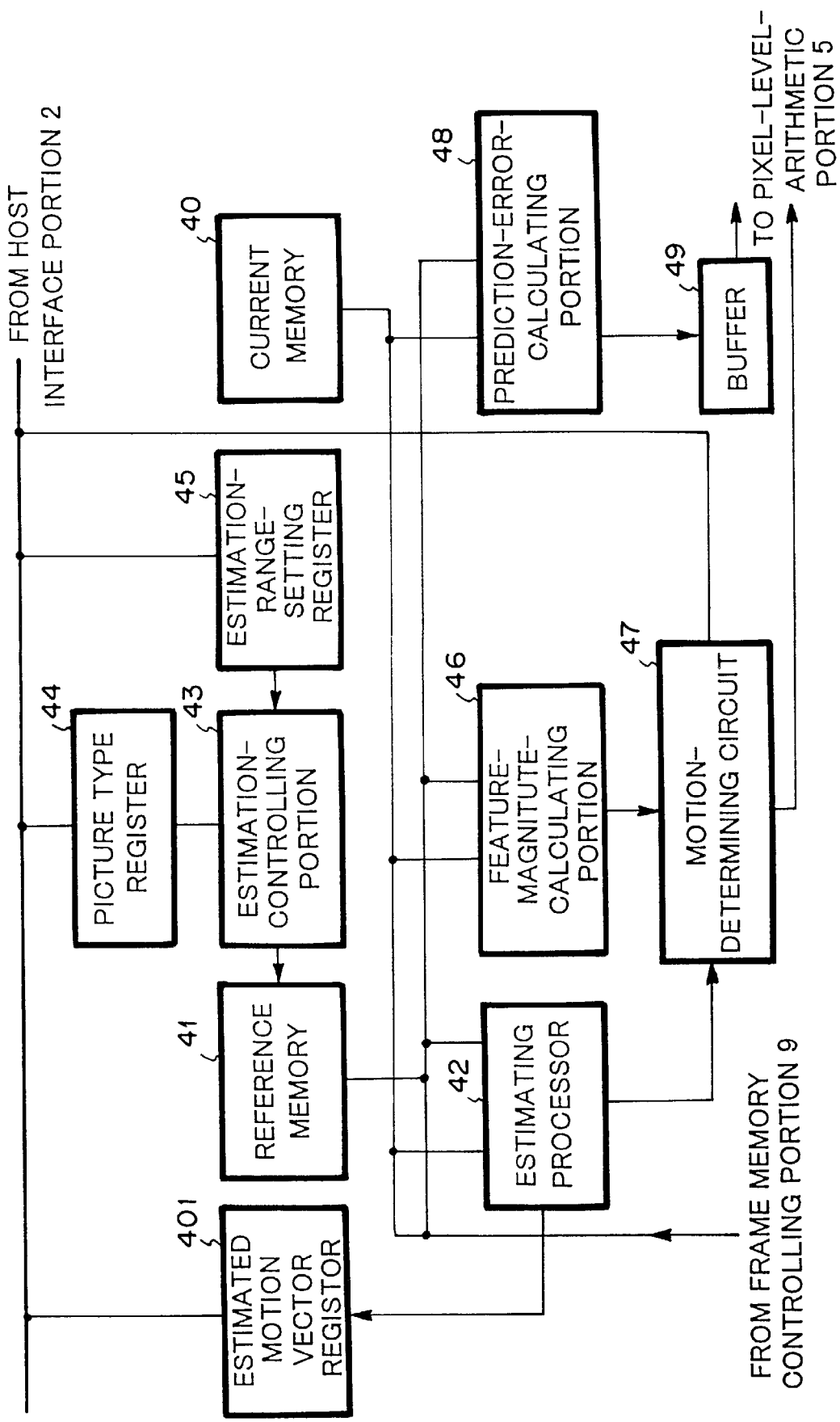
FIG. 2 is a block diagram showing an example of the structure of motion-estimating portion 4 shown in FIG. 1.

FIG. 2 shows the structure of motion-estimating portion shown in FIG. 1. Current picture and reference pictures are transferred to current memory 40 and reference memory 41, respectively. The data of these pictures are supplied to estimating processor 42 when it is necessary. Estimation-controlling 43 controls these supply. Especially, range for estimation is determined by the value of estimation-range-setting-setting register 45. Estimation-controlling processor 43 determines whether estimation is forward or bi-directional referring to the contents of picture type register 44. Estimation is forward if the current picture is P-picture and bi-directional if it is B-picture. Motion-compensated prediction of enabled prediction mode is executed based on candidates for a motion vector. Feature magnitude is calculated in feature-magnitude-calculating portion 46. As a result, the final motion vector and prediction mode is determined in motion-determining circuit 47. In this case, AC power of prediction error or pixels is adapted as the feature magnitude.

Prediction-error-calculating portion 48 calculates prediction error based on the aforementioned judgement and the result of the calculation is transferred to pixel-level-arithmetic portion 5 after temporally buffered in buffer 49. At the same time, the feature magnitude of a macro block is transferred to pixel-level-arithmetic portion 5. Moreover, predicted picture is transferred to pixel-level-arithmetic portion 5. In the case that motion-estimating portion 4 treats only luminance component and pixel-level-arithmetic portion 5 generates predicted picture of color difference signal, a motion vector and a prediction mode are also transferred from motion-estimating portion 4 to pixel-level-arithmetic portion 5. A motion vector and a prediction mode are transferred to variable-length-encoding portion 6 and encoded there.

Pixel-level-arithmetic portion 5 executes DCT, quantization, dequantization, and IDCT. Transform coefficients are generated as a result of DCT and quantization. Transform coefficients are directly transferred from pixel-level-arithmetic portion 5 to variable-length-encoding portion 6. A decoded picture is generated by adding the result of IDCT to a predicted picture. The decoded picture is stored in frame memory 10 through buffer 15. The decoded picture is used as reference picture when encoding other pictures and also for monitoring picture quality. In the case that pixel-level-arithmetic portion 4 processes only luminance component, the similar process is executed in picture-level-arithmetic portion 5 after reading all of the data necessary for generating a predicted picture and prediction errors from frame memory 10.

Figure 3:
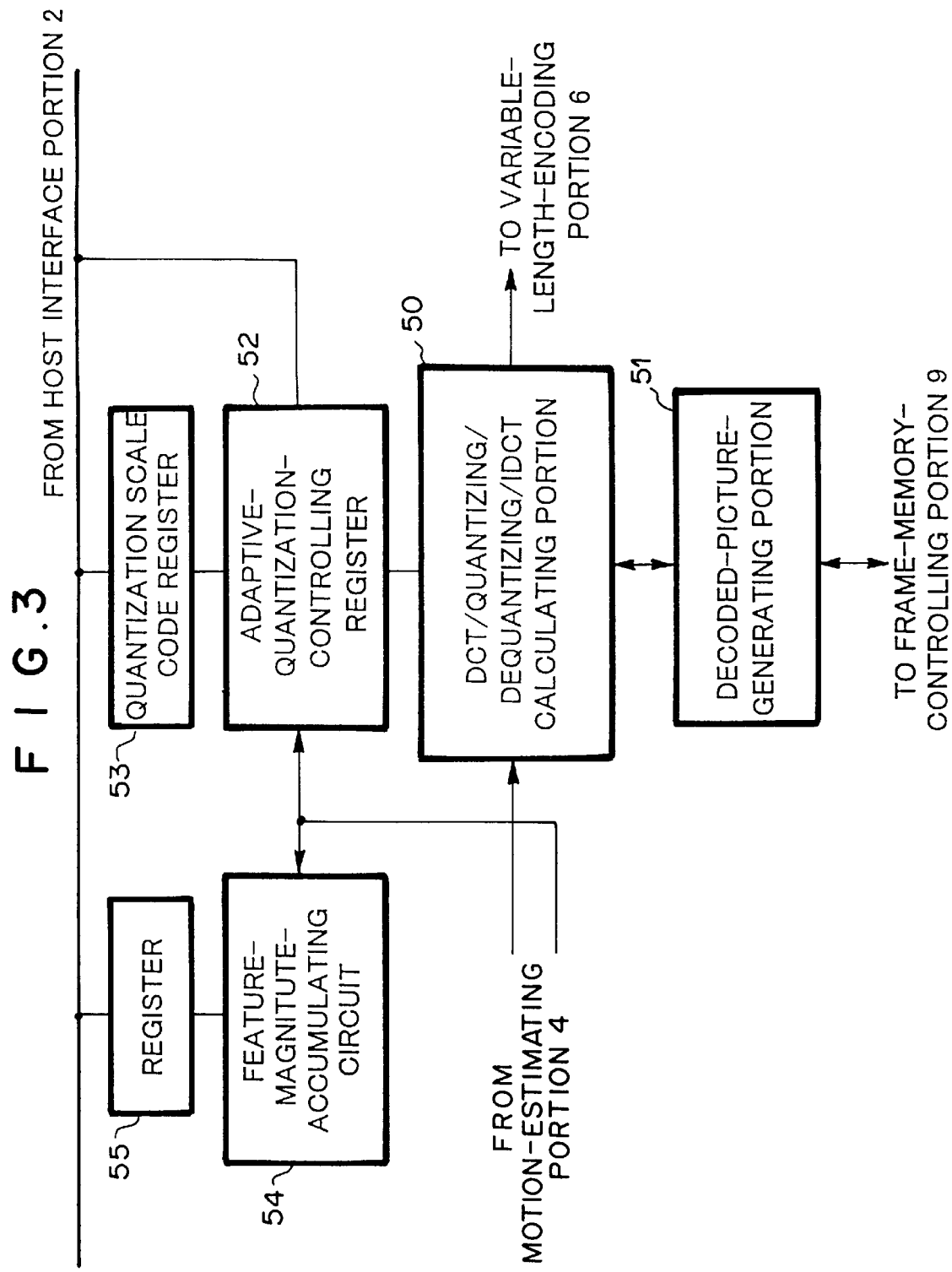
FIG. 3 is a block diagram showing an example of the structure of pixel-level-arithmetic portion 5 shown in FIG. 1.

FIG. 3 shows the structure of pixel-level-arithmetic portion 5. Prediction errors are transferred from motion-estimating portion 4 to DCT/quantizing/dequantizing/IDCT calculating portion 50 and calculation of DCT, quantizing, dequantizing and IDCT is executed for the prediction errors there. In this case, adaptive-quantization-controlling register 52 changes quantization scale code in quantization scale code register 53 according to feature magnitude transferred from motion-estimating portion 4. Quantized coefficients are transferred from DCT/quantizing/dequantizing/IDCT calculating portion 50 to variable-length-encoding portion 6 directly. The result of IDCT is added to predicted picture read from motion-estimating portion 4 in decoded-picture-generating portion 51 and the sum, which is decoded picture, is stored in frame memory 10 through buffer 15. On the other hand, feature magnitude is accumulated in feature-magnitude-accumulating circuit 54, the result of accumulation is stores in register 55 to make it readable.

Variable-length-encoding portion 6 encodes quantized coefficients to variable-length code. Variable-length-encoding portion 6 also encodes other data in picture layer or lower layers such as motion vector to variable-length code. Bit stream of variable-length code is stored in frame memory through buffer 16.

Figure 4:
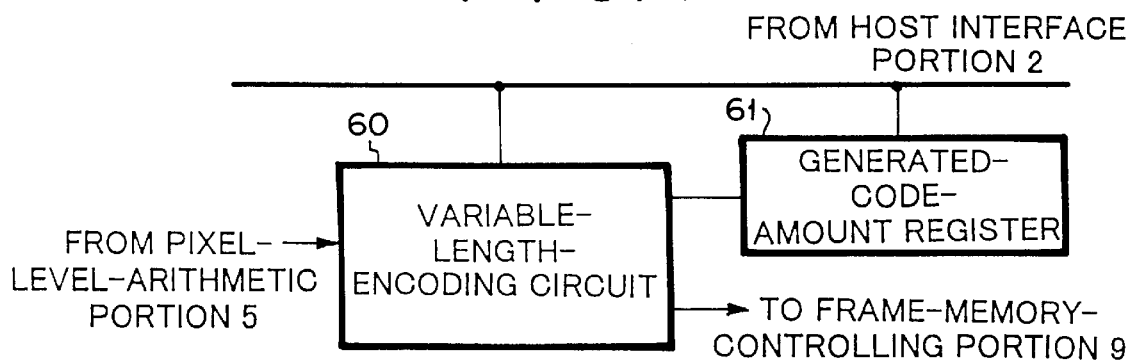
FIG. 4 is a block diagram showing an example of the structure of variable-length-encoding portion 6 shown in FIG. 1.

FIG. 4 shows the structure of variable-length-encoding portion 6 shown in FIG. 1. Most of the variable-length encoding process is executed in variable-length-encoding circuit 60. After the encoding process has finished for one picture, the amount of codes generated for the picture is stored in generated-code-amount register 61 The amount in generated-code-amount register 61 is readable.

Code-outputting portion 7 read bit stream data and header data stored in frame memory 10 through buffer 17 dependently, edit them and output them. Vide-outputting portion 8 read locally-decoded pictures or source pictures stored in frame memory 10 through buffer 18 and output them. Vide-outputting portion 8 converts picture read from buffer 18 to output format if it is necessary. For example, vide-outputting portion 8 executes conversion from 4:2:0 format to 4:2:2 format.

Referring FIG. 1, video-inputting portion 3, motion-estimating portion 4, pixel-level-arithmetic portion 5, and variable-length-encoding portion 6 are controlled by controlling processor 1 through host interface portion 2. Host interface portion adjusts the timing of flow of signals between controlling processor 1 and video-inputting portion 3, motion-estimating portion 4, pixel-level-arithmetic portion 5, and variable-length-encoding portion 6. It is preferable that host interface 2 takes the topology of bus from the point of view of the scale of circuits.

Controlling processor initializes and in real-time controls video-inputting portion 3, motion-estimating portion 4, pixel-level-arithmetic portion 5, and variable-length-encoding portion 6. Audio-coding portion 11 may be omitted in this mode of embodiments. If audio-coding portion 11 exists, it transfers encoded audio data to controlling processor 1 and controlling processor 1 stores the encoded audio data via the path not shown in figures. Code-outputting portion 7 reads the encoded audio data as well as picture code and header data, edit them together, and output them.

Picture coding is usually executed every rectangular region such as a macro-block which consists of 16×16 pixels. In this modes of embodiments, video-inputting portion 3, motion-estimating portion 4, pixel-level-arithmetic portion 5, and variable-length-encoding portion 6 operate for every period of macro-block.

Frame-memory-controlling portion 9 controls access to frame memory. Frame-memory-controlling portion 9 also operates for every period of macro-block.

With reference to FIG. 6, the scheduling of the access to frame memory 10 will be described. FIG. 6 shows writing to or reading from frame memory 10. In FIG. 6, I represents writing by video-inputting portion, F, B, and Yc represent reading by motion-estimating portion 4, Cc represents reading by pixel-level-arithmetic portion 5, L represents writing by pixel-level-arithmetic portion 5, V represents writing by variable-length-encoding portion 6, S represents reading by code-outputting portion 7, O represents reading by vide-outputting portion 8, where the target of each of accesses is frame memory 10. The detailed scheduling is determined by process of video-inputting portion 3, motion-estimating portion 4, pixel-level-arithmetic portion 5, and variable-length-encoding portion 6. Whether scheduling adopts arbitration or fixed time slot for solving or avoiding contention depends on the mode of embodiments. Such operation as setting header in frame memory 10, writing audio code in frame memory 10, or the like may be added as long as there remains spare time in the period of one macro-block processing.

With reference to FIG. 7, the memory map of frame memory 10 will be described. Speaking of the relation between each of the regions in memory map and each of portions in FIG. 1, source-picture-storing region corresponds to input picture written by video-inputting portion 3, locally-decoded-picture-storing region corresponds to decoded picture written by pixel-level-arithmetic portion 5, picture code buffer corresponds to bitstream written by variable-length-encoding portion 6, audio code buffer corresponds to bit stream written by controlling processor 1, and header information, etc. corresponds to header information and the like written by controlling processor 1. The capacity of source-picture-storing region is so large that four source pictures may be stored there at the same time. This is because distance between pictures becomes up to three in the case that bi-directional prediction is executed on intra-frame structure. Locally-decoded-picture-storing region is so large that three locally-decoded picture may be stored there at the same time. This is because two reference pictures in both directions and one current picture have to be stored there.

Figure 5:
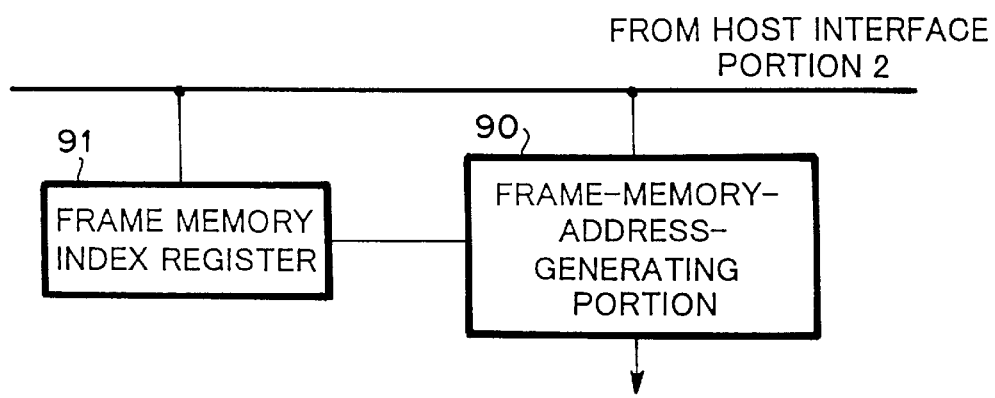
FIG. 5 is a block diagram showing an example of the structure of frame-memory-controlling portion 9 shown in FIG. 1.

FIG. 5 shows address-generating portion of frame-memory-controlling portion 9 shown in FIG. 1. Lower address of frame memory 10 is generated in frame-memory-address-generating portion 90 according to process of each of video-inputting portion 3, motion-estimating portion 4, pixel-level-arithmetic portion 5, and variable-length-encoding portion. On the other hand, upper address of frame memory 10 is specified by the contents of frame memory index register 91. The contents of frame memory index register 91 can dependently set for each of vide-inputting portion 3, motion-estimating portion 4, pixel-level-arithmetic portion 5, and variable-length-encoding portion 6. Controlling processor 1 controls these address setting.

Figure 8:
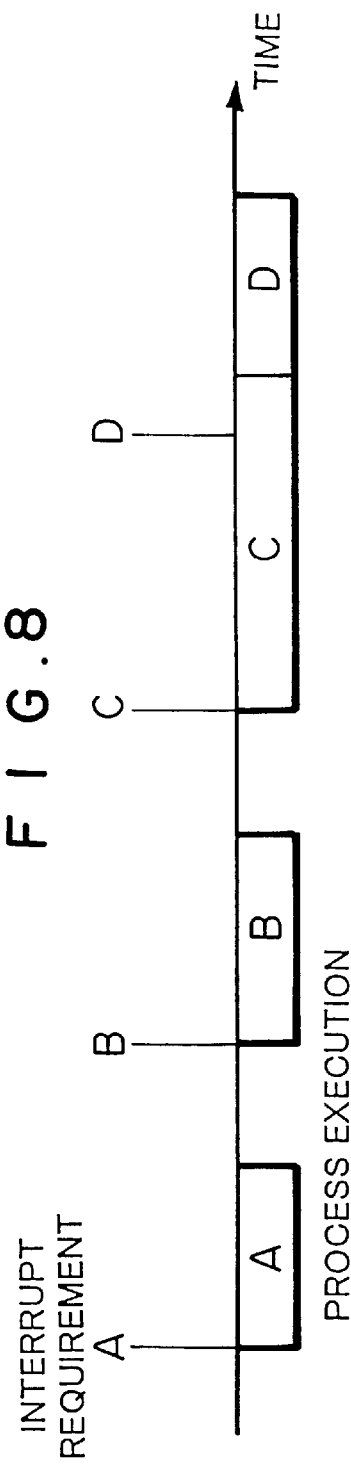
FIG. 8 is a timing chart showing interrupt requirement and execution of interrupt process of controlling processor shown 1 shown in FIG. 1.

With reference to FIG. 8, the operation of controlling processor 1 will be described. Controlling processor 1 is invoked by interruption requirement signals which are based on starting signal or ending signal of video-inputting portion 3, motion-estimating portion 4, pixel-level-arithmetic portion 5, variable-length-encoding portion 6, and the like. Controlling processor 1 refers to the contents of the registers of video-inputting portion 3, motion-estimating portion 4, pixel-level-arithmetic portion 5, variable-length-encoding portion 6, and the like, executes process based on the contents, sets the contents of the registers of video-inputting portion 3, motion-estimating portion 4, pixel-level-arithmetic portion 5, variable-length-encoding portion 6, and the like, and finishes process.

Interruption requirement signals are classified in that issued when inputting one picture starts or finishes, that issued when outputting one picture starts or finishes, that issued when picture encoding process for one picture starts or finishes, that issued when picture encoding process for a rectangular picture region such as a macro-block starts or finishes, and that issued when encoding process for pre-defined number of macro-blocks starts or finishes. In addition, it is possible and necessary that controlling processor is invoked for initializing LSI 20 in advance of regular picture encoding process. The initialization includes setting control assignment if necessary.

One example of the process of controlling processor 1 is controlling the amount of generated codes in which controlling processor 1 reads the contents of generate-code-amount register 61 every picture coding process for one or a few macro-block(s), determines optimum quantization scale code based on the contents, and sets it to quantization scale code register 53.

A more example of the process of controlling processor 1 is improving picture quality in which controlling processor 1 read the contents of register 55 holding the output of feature-magnitude-accumulating circuit 54 and changes the contents of adaptive-quantization-controlling register 52 based on the contents of register 55.

Another example of the process of controlling processor 1 is changing search range of motion-estimating in which controlling processor 1 changes the contents of estimation-range-setting register 45 based on the contents of estimated motion vector register 401 holding information about estimated motion vector.

Still another example of the process of controlling processor 1 is determining picture type in which controlling processor 1 sets the contexts of picture type register 44 and frame memory index register 91 based on the predefined cycle of picture types and the like.

Further example of the process of controlling processor 1 is detecting scene change base on the output of entire-picture-difference-detecting circuit, not shown in figures, in video-inputting portion 3 and executing special and conditional process related to controlling the amount of generated codes, improving picture quality, and determining picture type if the scene change is detected.

Similarly, controlling processor 1 can intermittently halt whole picture coding process every picture in the case input picture is pulled down at the ratio of 3:2 from cinema, which controlling processor 1 detects base on the output of the entire-picture-difference-detecting circuit.

An audio process of controlling processor 1 is writing audio code to frame memory 10 every time when audio-coding portion 11 generated code of one or some byte length.

In the case output codes conform to MP@ML (Main Profile at Main Level) of MPEG-2 (ISO/IEC13818-2), because about four megabit is required for one frame of NTSC signal having 720×480 pixels, about 32 megabit is required for frame memory 10 assuming memory map shown in FIG. 7. In this case, equal to or less than four megabit is used for the sum of picture code buffer, audio code buffer and header information, etc. This is because four megabit is sufficient to constitute virtual picture code buffer, virtual audio code buffer and header information area of size satisfying specification of MPEG2 if output bit rate up to 15 MBPS is assumed. For example, frame memory 10 of size of 32 megabit comprises a high-speed DRAM chip such as a synchronous DRAM (SDRAM). Although whether the access speed of frame memory 10 is high enough or not depends on search algorithm of motion-estimating portion 4 and buffer 14, it is high enough if adequate search algorithm is adapted.

Figure 9:
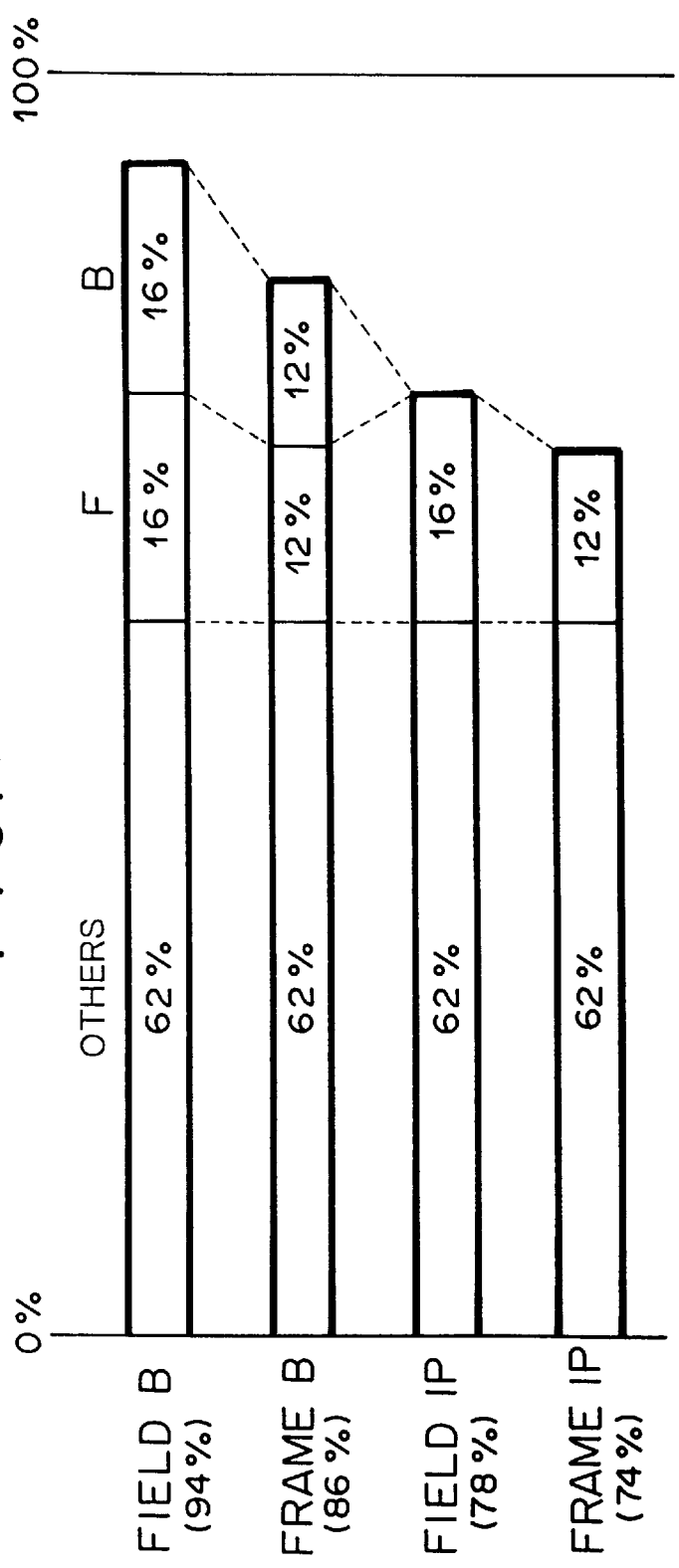
FIG. 9 is a graph showing access percentage to frame memory 10 shown in FIG. 1 in the case that frame memory is SDRAM.

FIG. 9 shows percentage of access to frame memory 10. In this figure, F represents forward and it corresponds F in FIG. 6, B represents backward and it corresponds B in FIG. 6, others corresponds access except F and B shown in FIG. 6. One hundred percent along to transversal axis corresponds to continuous access. Field B represents bi-directional process on field structure, Frame B represents bi-directional process on frame structure, Field IP represents intra-frame or predictive process on field structure, and Frame IP represents intra-frame or predictive process on frame structure. Although percentage of access depends on process and picture structure, FIG. 9 shows that access does not overflow even in the worst case in which Field B is selected.

FIG. 10 shows the required performance of controlling processor 1. Most frequently executed process is that of audio code transmission. Time required for transmitting one byte of audio code is 20.8 us/byte in the case audio-coding portion 11 output codes of 384 KBPS. If controlling processor 1 executes transmission based on interruption invoked every byte, 50 thousands of interruption is invoked. Although interruption frequency is so high, the required performance for audio code transmission is 1.5 MIPS because one interruption has only about 80 steps.

Code amount control is invoked every macro-block line. Number of macro-block line per one second is nine hundred because a macro-block line contains 16 lines, one frame contains 480 lines, and frame rate is 30 frame/sec. And steps in code amount control are about five hundred. So the required performance if about 0.45 MIPS.

Other processes such as picture-quality-improving process, search-range-changing process, picture-type-determining process, scene-change-judgement, and pull-down-picture-judgement are executed one time every picture and do not require high performance. Assuming the sum of steps of these processes is 2,000, required performance is 0.06 MIPS. Even if the sum is tenfold, required performance is 0.6 MIPS. The total performance required for controlling processes 1 is about two MIPS. A 32-bit RISC processor put on the market in 1996 having performance of 20 MIPS satisfies the requirement to controlling processor 1.

LSI 20 is regarded as a chip having only host interface, frame-memory interface, picture-input interface, picture-output interface, and code-output interface and executing most of the picture coding process. By grouping portions in LSI 20 so that interfaces of the portions between frame memory 10 and controlling processor 1 are put together, the number of interface pins is reduced. It is confirmed that the size of a LSI chip 20 is 12 mm square if C-MOS process of 0.35 um rule is applied base on the specification of the process.

In this mode of embodiments, audio-coding portion 11 and vide-outputting portion 8 may be omitted. Picture coding apparatus according to this mode of embodiments may output codes which do not conform to MP@ML of MPEG-2, and especially, do conform to MPEG-1 (ISO/IECI2).

According to the present invention, a dedicated LSI for picture coding may be shrunk and inexpensive. This is because increase of required circuit area by 30 to 40 percent for controlling processors when they are embedded on separately made chips for video-inputting portion, motion-estimating portion, pixel-level-arithmetic portion respectively does not arise. And this is because cost reduction accompanied to the reduction of circuit area is significant in the case of LSI.

In addition, according to the present invention, number of components, cost, and power consumption of the picture coding apparatus is reduced. This is because in comparison with that plural memory chips of which each is coupled with each of function portions are required in conventional apparatus, only one memory chip is required to which each of function portions accesses through one interface.

Although the present invention has been shown and described with respect to best mode embodiments thereof, it should be understood by those skilled in the art that foregoing and various other changes, omissions, and additions in the form and detail thereof may be made therein without departing from the spirit and scope of the present invention.

What is claimed is:

1. A picture coding apparatus for executing intra-frame predictive picture coding which comprises:

video-inputting means for inputting picture data;

motion-estimating means for estimating motion-vector of each of macro-blocks of said picture data;

pixel-level-arithmetic means which performs orthogonal transform, quantization, dequantization, and inverse orthogonal transform;

variable-length encoding means;

code-outputting means;

frame memory;

frame-memory-controlling means coupled with said frame memory;

controlling processor; and host interface means coupled with said controlling processor, wherein said video-inputting means, said motion-estimating means, said pixel-level-arithmetic means, said variable-length encoding means and said code-outputting means are coupled with said frame-memory-controlling means through individual buffers independent each other; said video-inputting means, said motion-estimating means, said pixel-level-arithmetic means, said variable-length encoding means and said code-outputting means execute time-shared data transmission with said frame memory; said video-inputting means, said motion-estimating means, said pixel-level-arithmetic means, said variable-length encoding means and said frame-memory-controlling means are coupled with said host interface means, and comprise registers of which contents are referred to and set by said controlling processor.

2. The picture coding apparatus according to claim 1, which further comprises:

video-outputting means for monitoring the quality of locally decoded picture coupled with said frame-memory-controlling means through another buffer.

3. The picture coding apparatus according to claim 1, which further comprises:

audio-coding means coupled with said controlling processor, wherein said controlling processor receives audio code from said audio-coding means, and writes said audio code in said frame memory; said code-outputting means reads said audio code, video code, and header data independently one another from said frame memory, edits said audio code, said video code, and said header data, and outputs said audio code, said video code, and said header data.

4. The picture coding apparatus according to claim 1, wherein said frame-memory-controlling means switches said time-shared data transmission every unit period base on an constant scheduling method.

5. The picture coding apparatus according to claim 1, wherein said controlling processor is invoked every unit period for processing rectangular area of picture of certain size, executes reference to the contents of said register through said host interface means, executes time-variable program and executes setting of the contents of said register through said host interface means.

6. The picture coding apparatus according to claim 1, wherein said pixel-level-arithmetic means comprises a quantization scale code register, said variable-length encoding means comprises a generated-code-amount register, and said controlling processor refers to and sets the contents of said quantization scale code register and generated-code-amount register, whereby the amount of generated code is controlled in real time.

7. The picture coding apparatus according to claim 1, wherein said pixel-level-arithmetic means comprises a adaptive-quantization-controlling register, a feature-magnitude-accumulating circuit, and a accumulated-value register for storing the result of said feature-magnitude-accumulating circuit, and said controlling processor refers to and sets the contents of said adaptive-quantization-controlling register and said accumulated value register, whereby the process of improving picture quality is controlled in real time.

8. The picture coding apparatus according to claim 1, wherein said motion-estimating means comprises a motion-vector register for storing estimated motion-vector and a estimation-range-setting register, and said controlling processor refers to and sets the contents of said motion-vector register and said estimation-range-setting register, whereby the range of motion estimation is changed in real time.

9. The picture coding apparatus according to claim 1, wherein said motion-estimating means comprises a picture type register, and said controlling processor sets the contents of said picture type register, whereby picture type is changed in real time.

10. The picture coding apparatus according to claim 1, wherein said frame-memory-controlling means comprises a picture index register, and said controlling processor sets the contents of said picture index register, whereby the region in which picture data inputted by said video-inputting means is written, the region in which predicted picture data calculated by said pixel-level-arithmetic means is written, and the region from which said video-outputting means reads said locally decoded picture are changed in real time.

11. The picture coding apparatus according to claim 1, wherein said code-outputting means generates output picture code by reading and editing the output data of said variable-length encoding means stored in said frame memory and the picture header set in said frame memory by said controlling processor, independently each other.

12. The picture coding apparatus according to claim 1, wherein said video-inputting means comprises a entire-picture-difference-detecting circuit, and said controlling processor determines whether a current picture which said video-inputting means inputs is entirely different from the preceding picture by referring to the output of said entire-picture-difference-detecting circuit and changes the process of picture coding based on the determined result.

13. The picture coding apparatus according to claim 6, wherein said video-inputting means comprises a entire-picture-difference-detecting circuit, and said controlling processor determines whether a current picture which said video-inputting means inputs is entirely different from the preceding picture by referring to the output of said entire-picture-difference-detecting circuit and changes the contents of said quantization scale code register.

14. The picture coding apparatus according to claim 9, wherein said video-inputting means comprises a entire-picture-difference-detecting circuit, and said controlling processor determines whether a current picture which said video-inputting means inputs is entirely different from the preceding picture by referring to the output of said entire-picture-difference-detecting circuit and changes the contents of said picture type register.

15. The picture coding apparatus according to claim 1, wherein said video-inputting means comprises a entire-picture-difference-detecting circuit, and said controlling processor determines whether a current picture which said video-inputting means inputs is same as the preceding picture by referring to the output of said entire-picture-difference-detecting circuit and causes a change in the process of picture coding based on the determined result.

16. The picture coding apparatus according to claim 15, wherein said change in the process of picture coding takes a definite form of eliminating repetitive fields of pictures by halting the process of picture coding.

17. The picture coding apparatus according to claim 1, wherein said orthogonal transform is discrete cosine transform.

\* \* \* \* \*